(12) United States Patent
Weston et al.

(10) Patent No.: US 7,300,899 B2
(45) Date of Patent: *Nov. 27, 2007

(54) LITHIUM EXCHANGED ZEOLITE X ADSORBENT BLENDS

(75) Inventors: Kerry Weston, Louisville, KY (US); Dave Jaussaud, Louisville, KY (US); Robert L. Chiang, Basking Ridge, NJ (US)

(73) Assignee: Zeochem, LLC, Louisville, KY (US)

( * ) Notice: Subject to any disclaimer, the term of this patent is extended or adjusted under 35 U.S.C. 154(b) by 230 days.

This patent is subject to a terminal disclaimer.

(21) Appl. No.: 11/177,969

(22) Filed: Jul. 8, 2005

(65) Prior Publication Data

US 2005/0272594 A1 Dec. 8, 2005

Related U.S. Application Data

(60) Continuation-in-part of application No. 10/765,018, filed on Jan. 26, 2004, now Pat. No. 6,918,948, which is a division of application No. 10/054,041, filed on Jan. 22, 2002, now Pat. No. 6,743,745.

(51) Int. Cl.
*B01J 29/06* (2006.01)
*B01J 29/08* (2006.01)
*B01D 53/02* (2006.01)

(52) U.S. Cl. ............... 502/64; 502/60; 502/68; 502/80; 502/84; 502/407; 502/411; 502/515; 95/116; 95/117; 95/130; 95/138; 95/139; 95/140

(58) Field of Classification Search ........... 95/116, 95/117, 130, 138, 139, 140; 502/60, 68, 502/80, 84, 407, 411, 515, 64

See application file for complete search history.

(56) References Cited

U.S. PATENT DOCUMENTS

| | | |
|---|---|---|
| 2,882,244 A | 4/1959 | Milton |
| 2,973,327 A | 2/1961 | Mitchell |
| 3,049,449 A | 8/1962 | Allegrini |
| 3,078,639 A | 2/1963 | Milton |
| 3,219,590 A | 11/1965 | Ribaud |
| 4,420,419 A | 12/1983 | Ogawa |
| 4,762,537 A | 8/1988 | Fleming |
| 4,859,217 A | 8/1989 | Chao |
| 5,001,098 A | 3/1991 | Pacaud |
| 5,173,462 A | 12/1992 | Plee |
| 5,203,887 A | 4/1993 | Toussaint |
| 5,292,360 A | 3/1994 | Pacaud |
| 5,316,993 A | 5/1994 | Sextl |
| 5,413,978 A | 5/1995 | Kramer |
| 5,468,700 A | 11/1995 | Ward |
| 5,493,821 A | 2/1996 | Cohen |
| 5,531,808 A | 7/1996 | Ojo |
| 5,883,034 A | 3/1999 | Drake |
| 5,885,331 A | 3/1999 | Reiss |
| 5,948,726 A | 9/1999 | Moskovitz |
| 5,962,358 A | 10/1999 | Hees |
| 6,027,548 A | 2/2000 | Ackley |
| 6,106,593 A | 8/2000 | Golden |
| 6,130,179 A | 10/2000 | Sampson |
| 6,183,539 B1 | 2/2001 | Rode |
| 6,270,557 B1 | 8/2001 | Millet |
| 6,309,445 B1 | 10/2001 | Gittleman |
| 6,409,800 B1 | 6/2002 | Ojo et al. |
| 6,444,601 B1 | 9/2002 | Purcell, Jr. |
| 6,596,256 B1 | 7/2003 | Ojo |
| 6,616,732 B1 | 9/2003 | Grandmougin |
| 6,743,745 B2 | 6/2004 | Jaussaud |
| 6,918,948 B2 | 7/2005 | Jaussaud |
| 2003/0051673 A1 | 3/2003 | Raymond |
| 2004/0156766 A1 | 8/2004 | Jaussaud |

FOREIGN PATENT DOCUMENTS

| | | |
|---|---|---|
| EP | 0519073 | 12/1992 |
| EP | 0826631 | 3/1998 |
| EP | 0940174 | 9/1999 |
| EP | 1092465 | 4/2001 |
| FR | 2678525 | 1/1993 |
| GB | 827043 | 2/1960 |
| GB | 1051621 | 12/1966 |
| JP | 5147926 | 6/1993 |
| JP | 11246214 | 9/1999 |
| WO | WO 96/14916 | 5/1996 |
| WO | WO 99/46031 | 9/1999 |
| WO | WO 00/01478 | 1/2000 |
| WO | WO 01/24923 | 4/2001 |

*Primary Examiner*—Elizabeth D. Wood
(74) *Attorney, Agent, or Firm*—Scott R. Cox

(57) ABSTRACT

A lithium exchanged zeolite X adsorbent blend with improved performance characteristics produced by preparing a zeolite X, preparing a binder which includes highly dispersed attapulgite fibers wherein the tapped bulk density of the highly dispersed attapulgite fibers measured according to DIN/ISO 787 is more than about 550 g/ml, mixing the zeolite X with the binder to form a mixture, forming the mixture into a shaped material, ion exchanging the zeolite X at least 75% with lithium ions, and calcining the shaped material.

24 Claims, No Drawings

LITHIUM EXCHANGED ZEOLITE X ADSORBENT BLENDS

CROSS REFERENCE TO RELATED APPLICATIONS

This application is a continuation-in-part application based on application Ser. No. 10/765,018, filed on Jan. 26, 2004 now U.S. Pat. No. 6,918,948, which was a divisional application based on application Ser. No. 10/054,041, filed on Jan. 22, 2002, now U.S. Pat. No. 6,743,745, which issued Jun. 1, 2004.

BACKGROUND OF INVENTION

This invention relates to adsorbent blends for the generation of oxygen from a gaseous mixture, wherein a particularly useful blend includes a zeolite X blended with a binder, wherein the binder includes highly dispersed attapulgite fibers and wherein the zeolite X is lithium exchanged, preferably after blending, and processes for the use of the adsorbent blend. This invention also relates to processes of production of adsorbent blends prepared by the blending of zeolite X with a binder to form a blend, which binder includes highly dispersed attapulgite fibers, and then ion exchanging the zeolite X component of the blend with lithium cations.

Zeolites are hydrated metal alumino silicates having the general formula $$M_{2/n}O:Al_2O_3:xSiO_2:yH_2O$$

where M usually represents a metal, n is the valence of the metal M, x varies from 2 to infinity, depending on the zeolite structure type, and y designates the hydrated status of the zeolite. Most zeolites are three-dimensional crystals with a crystal size in the range of 0.1 to 30 µm. Heating these zeolites to high temperatures results in the loss of the water of hydration, leaving a crystalline structure with channels of molecular dimensions, offering a high surface area for adsorption of inorganic or organic molecules. The adsorption of these molecules is limited by the size of the zeolite channels. The rate of adsorption is limited by the laws of diffusion.

One limitation on the utilization of zeolite crystals is their extremely fine particle size. Large, naturally-formed agglomerates of these crystals break apart easily. Because the pressure drop through a bed containing zeolite particle is often prohibitively high, zeolite crystals alone cannot be used in fixed beds for various dynamic applications, such as the drying of natural gas, drying of air, separation of impurities from a gas stream, separation of liquid product streams, generation of oxygen from a gaseous mixture, and the like. Therefore, it is desirable to blend these crystals with binder materials to provide an agglomerate mass of the crystals, which exhibits a reduced pressure drop.

To permit the utilization of these zeolite crystals, different types of clays are conventionally used as binders with the crystals, including attapulgite, palygorskite, kaolin, sepiolite, bentonite, montmorillonite and mixtures thereof. The clay content of a blended zeolite can vary from as low as 1 percent to as high as 40 percent, by weight, although the preferred range is from about 10 to about 25 percent, by weight.

An adsorbent for separating gases comprising a binder and a crystalline, low silica faujasite-type zeolite with a silica to alumina molar ratio of 1.9 to 2.1 is disclosed in EP 0 940 174 A2. This reference discloses the blending of a zeolite with a conventional, dense attapulgite clay binder. The bulk density of the binder is not disclosed.

The use of a zeolite X having its base metal ions ion exchanged with lithium ions has also been disclosed. Such zeolites have been useful for the separation of nitrogen from oxygen. A process for the use of lithium exchanged zeolite X for nitrogen absorption is disclosed in U.S. Pat. No. 4,859,217.

One problem with zeolites blended with conventional binders is decreased diffusion. The larger the diameter of the zeolites, the slower the rate of diffusion of the molecules to be adsorbed. Particularly in the field of pressure swing adsorption, this effect is highly adverse to short cycle time and thus to productivity. Enhanced kinetic values or faster mass transfer rates can result in lower power consumption and higher adsorbent productivity.

It has been recognized that a reduction in the particle size of formed zeolites leads to shorter mass transfer zones and shorter cycle times. This is based on the assumption that the time needed for adsorbates to travel through the macropores of the adsorbents limits the cycle time, i.e. macropore diffusion is the rate limiting step in these processes. The problem can be partially solved by adding pore forming compounds to the zeolite/binder blend before the forming step.

Accordingly it is an object of the invention to disclose a process for the production of an adsorbent blend, which is especially useful for the generation of oxygen from a gaseous stream, a process for the use of that blend, and the composition of the blend.

These and other objects are obtained by the processes for production, the processes of use and products of the invention disclosed herein.

SUMMARY OF THE INVENTION

The present invention is an adsorbent blend comprising a zeolite X, blended with a binder, wherein the binder comprises highly dispersed attapulgite fibers with a tapped bulk density of above 550 g/l, as measured according to DIN/ISO 787, and wherein the zeolite X is ion exchanged at least about 75% with lithium ions, preferably after the zeolite X and the binder are blended.

The present invention is also a process for the production of a lithium exchanged zeolite X/binder blend, preferably used for the generation of oxygen from a gaseous mixture, comprising preparing a zeolite X, preparing a binder containing highly dispersed attapulgite fibers, wherein the tapped bulk density of the highly dispersed attapulgite fibers is above 550 g/l, as measured according to DIN/ISO 787 mixing the zeolite X with the binder, calcining the mixture to form a zeolite X/binder blend, ion exchanging the zeolite X component of the blend with lithium ions to an exchange level of at least about 75%, and drying and calcining the ion exchanged zeolite X/binder blend to form the blend of the invention.

The invention is also a process for the generation of oxygen from a gaseous feed stream containing oxygen comprising passing the gaseous feed stream over a zeolite X blend comprising a lithium exchanged zeolite X blended with a binder containing highly dispersed attapulgite fibers, as defined above.

DETAILED DESCRIPTION OF THE INVENTION

The present invention is a zeolite X blended with a binder, which binder includes highly dispersed attapulgite fibers and which zeolite X is lithium exchanged, preferably after said blending, a process for formation of that blend and a process for use of that blend. The invention is based on the discovery that the adsorption rate of an adsorbent blend is dependent not only upon the size of the zeolite particles, but also the type and characteristics of the binder blended with the zeolite. It has been surprisingly discovered that the same type and quantity of zeolite, when blended with different types of binders, produces zeolite blends which exhibit different adsorption characteristics, depending upon the binder that is used. The phrase "adsorption rate" or "sorption rate" or "mass transfer rate" means the rate at which an adsorbate loading in a feed stream changes over a given period of time for a given adsorption separation process.

The prior art suggests that the adsorption rate of a zeolite adsorbent blend is only a function of the porosity and particle size of the zeolite crystals. It has now been surprisingly discovered that the type of binder that is used to bind the zeolite crystals together also plays a role in the adsorption rate of the zeolite adsorbent blend.

Adsorbent aggregates or blends are formed by mixing zeolite crystals with binder materials. Various types of zeolites may be used to form adsorbent blends including zeolite A, zeolite X, zeolite Y, zeolite ZSM-5, zeolite Beta, synthetic mordenite and blends thereof. These zeolites may be used singuarly or in mixtures of two or more zeolites.

Zeolites may be present in various ion exchanged forms. The particularly preferred zeolite utilized in a blend depends upon the adsorbate that is to be adsorbed from the feed stream. When the adsorption process is for the purification of gases, notably by pressure swing adsorption (PSA), vacuum swing adsorption (VSA), vacuum-pressure swing adsorption (VPSA) or temperature swing adsorption (TSA) methods, the preferred zeolites include zeolite A or zeolite X.

In the preferred process of the invention, the zeolite utilized is zeolite X. It is specifically designed for the generation of oxygen from a gaseous mixture, such as an air stream. In a particularly preferred process, the zeolite X utilized is a low silica zeolite X, known as "LSX," or low silica faujasite, known as "LSF". The general formula for LSF is 2.0 $SiO_2:Al_2O_3:1.0$ $M_pO$, wherein "M" represents a metal and "$p$" represents various numbers depending on the valence of the metal.

Zeolite X generally has a Si:Al equivalent ratio of about 1.0 to about 1.25 with a more preferred ratio of 1 to 1.05. In one example a synthesized LSF has the following anhydrous chemical composition: 2.0 $SiO_2:Al_2O_3:0.73$ $Na_2O:0.27$ $K_2O$, although the quantity of sodium and potassium ions can vary, sometimes significantly, depending upon the process of manufacture of the LSF.

For the present invention a substantial percentage of the sodium and potassium ions of the zeolite X, after having been blended with the binder, are ion exchanged with lithium ions using conventional ion exchange procedures, such as by treatment of the zeolite X with a lithium salt, preferably lithium chloride, to a level of ion exchange of at least about 75%, preferably at least 85%, and most preferably at least 95% of the exchangeable metal ions. Sodium and potassium ions may remain in the zeolite X crystals.

While the most preferred lithium zeolite X component of the blend is ion exchanged up to lithium levels above 95%, useful X type zeolites can be formed wherein the zeolite is ion exchanged with lithium ions only to a level of at least about 75%. When the zeolite X is ion exchanged to levels between about 75% and 95%, another preferred embodiment requires additional ion exchange of the remaining cations of the zeolite crystals, which generally comprise sodium and/or potassium cations, with from about 0.1% up to 25% of the total cations in the form of divalent cations, including, but not limited to, zinc and alkaline earth metals, such as calcium, barium, and strontium, preferably calcium, and combinations thereof. Further useful zeolite X crystals can also be produced, wherein the extent of lithium ion exchange is above about 75% with from about 0.1% up to 25% of the remaining metal ions being ion exchanged with trivalent cations, such as, but not limited to, lanthanum and rare earth metals. In addition, the zeolite can be ion exchanged with combinations of divalent and trivalent ions to levels from about 0.1% up to 25% of the total metal ions of the zeolite X, as long as the total metal ions are ion exchanged at least 75% with lithium. (For reference purposes the term "lithium exchanged zeolite X" means a zeolite X which has been ion exchanged to levels of at least about 75% with lithium ions and includes, but is not limited to, the alternative embodiments described above.)

The lithium exchanged zeolite X of the invention has shown particular utility for the generation of oxygen from a gaseous mixture, particularly the separation of nitrogen from oxygen for industrial, commercial and/or medical purposes. Particularly preferred uses of this zeolite X include the generation of oxygen from an air stream for use in the medical gas industry and for industrial oxygen generation.

Binder materials are utilized to bind the individual lithium exchanged zeolite X crystals together, to form shaped products and to reduce the pressure drop during the adsorption process. However, in prior art products, the binder material has not enhanced the adsorption capability of the zeolite. In fact, conventional binder materials have generally reduced the adsorption capacity and adsorption rate of the zeolite. Binder materials, which have commonly been utilized with zeolites in the past, include clays, such as kaolin, palygorskite-type minerals, such as attapulgite, and smectite-type clay minerals, such as montmorillonite or bentonite. These clay binders have been used singuarly or in mixtures of two or more different types of clay binders.

The inventors have discovered that a particularly useful blend of lithium exchanged zeolite X and clay binder is produced when the clay material is comprised at least partly of an attapulgite clay which has been "highly dispersed." Generally speaking, clay particles, especially attapulgite clay particles, exist as dense materials with very limited adsorption capabilities. These conventional clay binder particles are different in size and shape from the zeolite particles. When formed as a blend with lithium exchanged zeolite X crystals, they tend to coat the zeolite crystals as well as occupy the space between them. This arrangement significantly reduces both the adsorption capacity and adsorption rate of the zeolite.

In particular, conventional attapulgite clay particles, even after mining and work-up, are naturally formed in the shape of dense bundles of clumped bristles. The existence of these bundles has been confirmed using scanning electron microscopy (SEM). These bristles must be separated or ground to permit their use as binders for zeolite particles. Without grinding these attapulgite clay particles to a smaller size, a non-porous layer of attapulgite clay particles is created in the formed zeolite X blend, preventing or substantially limiting, diffusion of adsorbates through the blend. The conventional attapulgite clays that have been utilized in the past are produced by dry grinding the attapulgite clay. In this conventional process these dry ground attapulgite clay bundles of bristles are formed in a blend with the zeolite crystals. However, even after this conventional grinding of the attapulgite clay bundles, large bundles of attapulgite clay bristles are still present. When these conventional attapulgite clay bundles are formed in a blend with zeolite X to be utilized as adsorbents, the capability of the zeolite materials to adsorb the desired adsorbate is not substantially enhanced.

The applicants' invention utilizes "highly dispersed" attapulgite clay as at least a portion of the binder material that is formed as a blend with zeolite X crystals, particularly the highly lithium exchanged zeolite X crystals discussed above. The difference between conventional, dense attapulgite clay bundles and the "highly dispersed" attapulgite clay particles of the invention can be differentiated readily through the use of a scanning electron microscopy. Another method to distinguish between conventional dense attapulgite clay and the "highly dispersed" attapulgite clay products of the invention is by the use of tapped bulk density measurement as determined according to DIN/ISO 787. Dense attapulgite clay binders have a tapped bulk density of only about 400 g/l to about 530 g/l. In contrast, "highly dispersed" attapulgite binders have a tapped bulk density of about 550 g/l to about 700 g/l.

Another method to distinguish between conventional dense attapulgite clay and highly dispersed attapulgite clay products of the invention is by determining the water adsorption capacity of the attapulgite clay products. To determine whether the clay binder is "highly dispersed," the clay binder is fully saturated at 50 percent relative humidity at 25° C. until an equilibrium adsorption capacity is achieved. This process may take up to 72 hours. After full hydration of the clay is achieved, the clay is dried at 550° C. for at least two hours. The difference of the weight between the fully hydrated clay and the dried clay is the water adsorption capacity. For dense attapulgite clays, the water adsorption capacity is below 30 percent whereas for the "highly dispersed" attapulgite clay, the water adsorption capacity is above 35 percent.

While any process which produces attapulgite fibers, which are "highly dispersed" as defined above, is within the scope of the invention, one preferred process is disclosed in U.S. Pat. No. 6,130,179, the contents of which are incorporated by reference into this application. This patent fails to disclose or suggest the use of this highly dispersed attapulgite clay formed in a blend with zeolite, particularly zeolite X, more particularly zeolite LSX or LSF, and most particularly lithium exchanged zeolite X. The process of U.S. Pat. No. 6,130,179 utilizes a dispersant which disperses the individual attapulgite particles in water such that they remain in suspension even after other materials, including other clay and mineral species, are removed from that solution. Once the "highly dispersed" attapulgite clay is prepared, it is ready for use in the production of the adsorbent product of the invention.

The binder material that is used to form the blend with the lithium exchanged zeolite X of the invention may be comprised entirely of highly dispersed attapulgite fibers or the highly dispersed attapulgite fibers may form only a portion of the blend. The higher the percentage of the highly dispersed attapulgite fibers, the better performance of the overall blend. The percentage of highly dispersed attapulgite fiber in the binder should be at least 5% and may be up to 100% of the composition of the binder. Preferably the binder is comprised of at least 30%, more preferably at least 50%, and most preferably at least 90% of highly dispersed attapulgite fibers. The balance of the material that may be blended with the highly dispersed attapulgite fibers may be any conventional clay binder, such as attapulgite, kaolin, montmorillonite and bentonite and mixtures thereof. One process to produce the adsorbent blend product with improved performance characteristics according to the invention is as follows:

prepare the zeolite X, prepare a binder, comprising at least partially with highly dispersed attapulgite fibers, mix the zeolite X with the binder to form a zeolite X/binder system, dry and calcine the zeolite X/binder system; hydrate the dried zeolite X/binder system with water containing a lithium salt and ion exchange the zeolite X blended with the binder to at least about 75% ion exchange with lithium cations, and dry and calcine the lithium ion exchanged zeolite X/binder blend to form the adsorbent blend of the invention.

Other processes can be utilized to form the zeolite X/binder system of the invention, wherein the zeolite X is ion exchanged to at least about 75% with lithium ions prior to or after the blending with the binder. Any such process for the ion exchange of the zeolite X and the blending of that ion exchanged zeolite X with the binder of the invention is within the scope of the invention.

Once the appropriate zeolite X material is chosen for the given utilization, it is mixed with the binder, which includes highly dispersed attapulgite fibers. The amount of binder can range from about 2 to about 30 percent by weight, preferably from about 5 to about 20 percent and most preferably in the range of about 10 percent of the composition as a whole, by weight. The percentage of binder present is adjusted depending on the percentage of the binder that comprises highly dispersed attapulgite clay fibers. Blends of even highly ion exchanged lithium X zeolite with conventional binders not containing highly dispersed attapulgite clay fibers require utilization of about 20 percent or more of the binder material, such as a conventional attapulgite clay. Sufficient water is retained in or added to the mixture to make a formable mixture, i.e., one that can be easily extruded or formed into a bead.

The mixture is blended using a conventional blending device, such as a conventional mixer, until a mass of suitable viscosity for forming is obtained. The blended mixture is then formed into the appropriate shaped product. The products can be formed in any conventional shape, such as beads, pellets, tablets or other such conventional shaped products. Once the formed products are produced into the appropriate shape, they are calcined, preferably at about 600° C., for about 30 minutes to 2 hours.

Once the shaped products are formed, they are hydrated with water containing a lithium salt, such as lithium chloride. The quantity of the lithium salt that is added should be sufficient to achieve the ion exchange that is desired using conventional ion exchange procedures well known to those in the industry. Once the ion exchange process has been completed to the extent required, the ion exchanged zeolite X/binder blend is dried and calcined at a temperature of about 600° C. for about 30 minutes to 2 hours to form the final adsorbent blend of the invention.

In an optional preferred embodiment, a pore forming agent may be added to the zeolite X product/binder mixture during the mixing step to enhance the total pore volume of the end product. Among the acceptable pore forming agents are fibers, including rayon, nylon, sisal, flax and the like and organic polymers, including corn starch, starch derivatives, lignosulfonates, polyacrylamide, polyacrylic acid, cellulose, cellulose derivatives and the like. The amount of the pore forming agent that may be added is from about 2 to about 15 percent, by weight.

Products produced by the process of the invention show improved adsorption rates. The adsorption rate can be determined using several different methods. For example, in one process to determine the adsorption rate of the adsorbent blend of the invention, the amount of the adsorbed product over a given period of time is determined.

In a further process for the comparison of adsorption, the mass transfer zone of the blend of the invention can be compared to that of a conventional blend under given conditions. The shorter the mass transfer zone, the higher the adsorption rate.

Finally, the diffusion rate can be determined directly for certain gases or liquids. The higher the diffusion rate, the faster the adsorption rate.

It has been surprisingly discovered that by replacing a conventional binder with a binder containing highly dispersed attapulgite fibers of the invention, there is an improved adsorption rate regardless of which method is used to measure that rate of adsorption. The improvement in adsorption rate is at least about 10 percent, and may be as high as 200 percent, compared to products containing conventional clay binders, such as conventional attapulgite clay. This improvement is especially important because of the increased cost of the highly dispersed attapulgite binder over conventional attapulgite binders.

A further surprising improvement is in the ability of the lithium exchanged zeolite X adsorbent blend to maintain its mechanical strength even when the amount of the binder that is added to the mixture is reduced. Generally speaking, the more binder that is present in the forming process, the better the mechanical strength for the finished product. For conventional dense attapulgite binders, this improvement in the mechanical strength is dramatic when the percentage of attapulgite binder within the end product increases from zero to about 20 percent of the composition. Products made with conventional dense attapulgite binder of 10 percent or less are not practical as their mechanical strength drops below acceptable levels. It has been surprisingly discovered that a product produced using the highly dispersed attapulgite fibers of the invention produces an end product with adequate mechanical strength even when the quantity of the highly dispersed attapulgite binder in the end product is as low as 5 percent or less. Further, at any particular percentage of binder material, the mechanical strength of a product produced using the highly dispersed attapulgite fiber of the invention is higher than for a product made with only a conventional dense attapulgite binder.

It has also been surprisingly discovered that even when lower percentages of a highly dispersed attapulgite fiber are utilized in the binder of the adsorbent product, the rate of nitrogen adsorption increases. This increase in adsorption can be confirmed by the processes previously discussed. This improvement is at least 10 percent and in many cases as much as 30 percent or more.

The binder containing highly dispersed attapulgite fibers can form a blend with the lithium exchanged zeolite X and be used for a number of different processes. The blended product made with the lithium exchanged zeolite X and the binder containing at least a portion of the highly dispersed attapulgite binder is particularly useful for the production of oxygen. It is of considerable interest for industrial applications and is particularly useful in the medical gas industry for the separation of nitrogen from oxygen. This separation is particularly successful when the zeolite X product has been highly ion exchanged with lithium ions, as described above. When the zeolite X product is exchanged with lithium to high percentages, the separation of the nitrogen from the oxygen is particularly effective, even at room temperature.

There are a number of other processes for which this blend of a highly dispersed attapulgite clay and lithium exchanged zeolite X can be utilized and which are also covered by this invention.

These improvements are generally disclosed by the following examples:

EXAMPLES

Example 1

Samples of an attapulgite clay material that is conventionally used as a binder for zeolite X products and a highly dispersed attapulgite clay material were tested for tapped bulk density, residual water and water adsorption capacity. Tapped bulk density was determined according to DIN/ISO 787. (Actigel 208 obtained from ITC Floridin was used as the highly dispersed attapulgite clay in all examples. The conventional attapulgite clays were of different brands and obtained from ITC Floridin.)

A clay sample of about 10 grams was weighed in a porcelain crucible (weighing precision 1 mg) and heated to 550° C. for 2 hours. The sample was cooled to room temperature in a desiccator and weighed (weighing precision 1 mg). The weight difference led to the residual water amount.

Another clay sample of about 10 grams was weighed in a porcelain crucible (weighing precision 1 mg) and was water saturated at 50 percent relative humidity and 20° C. The equilibrium was reached within 72 hours. The sample was weighed (weighing precision 1 mg) and heated to 550° C. for 2 hours. The sample was cooled to room temperature in a desiccator and weighed (weighing precision 1 mg). The weight difference of the fully hydrated sample and fully dried sample led to the water adsorption capacity given in Table 1 below. The fully dried mass was taken as 100 percent clay.

TABLE 1

| | Attapulgite Clay Sample | | | |
| --- | --- | --- | --- | --- |
| | Highly Dispersed Clay | Conventional Dense Clay 1 | Conventional Dense Clay 2 | Conventional Dense Clay 3 |
| Tapped Bulk Density (g/ml) | 617 595 660 | 398 + 31 (average of 17 samples) | 529 + 20 (average of 21 samples) | 428 459 |
| Residual Water as Received (%) | 22.3 21.7 23.7 | 25.5 | 21.4 | 25.5 22.6 |
| Water Adsorption Capacity (%) | 36.8 36.0 36.0 | 28.8 | 25.0 | 29.7 28.8 |

As is clear from the Table, the bulk density of the highly dispersed clay was significantly higher than the bulk density of the conventional dense attapulgite clay. In addition, the water adsorption capacity of the highly dispersed attapulgite clay was significantly higher than that of the conventional dense attapulgite clay.

Although the invention has been described in detail, it is clearly understood that the same is by no way to be taken as a limitation on the scope of the invention.

The invention claimed is:

1. A composition for the generation of oxygen from a gaseous mixture comprising a zeolite X blended with a binder comprising highly dispersed attapulgite fibers, wherein the tapped bulk density of the highly dispersed attapulgite fibers, as measured according to DIN/ISO 787, is more than about 500 g/l and wherein cations of the zeolite X comprise at least about 75% lithium cations.

2. The composition of claim 1, wherein the cations of the zeolite X comprise at least about 95% lithium cations.

3. The composition of claim 1, wherein the zeolite X comprises low silica zeolite X.

4. The composition of claim 1, wherein the zeolite X has a silicon:aluminum ratio from about 1.0 to about 1.25.

5. The composition of claim 1, wherein the zeolite X has a silicon:aluminum ratio from about 1.0 to about 1.05.

6. The composition of claim 1, wherein the binder comprises from about 2 to about 30% of the composition, by weight.

7. The composition of claim 1, wherein the binder comprises from about 5 to about 20% of the composition, by weight.

8. The composition of claim 1, wherein from about 0.1% up to about 25% of the cations of the zeolite X comprise divalent cations.

9. The process of claim 8, wherein the divalent cations are selected from the group consisting of zinc, alkaline earth metals and mixtures thereof.

10. The composition of claim 1, wherein from about 0.1 to about 25% of the cations of the zeolite X comprise trivalent cations.

11. The composition of claim 10, wherein the trivalent cations comprise rare earth metal cations.

12. The composition of claim 11, wherein the rare earth metal comprise lanthanum.

13. The composition of claim 1, wherein the binder comprises at least about 5% highly dispersed attapulgite fibers, by weight.

14. The composition of claim 1, wherein the binder further comprises a clay material selected from the group consisting of conventional attapulgite, kaolin, montmorillonite and bentonite and mixtures thereof.

15. A process for production of a lithium exchanged zeolite X/binder blend absorbent product comprising preparing a zeolite X, preparing a binder comprising highly dispersed attapulgite fibers, wherein the tapped bulk density of the highly dispersed attapulgite fibers, as measured according to DIN/ISO 787, is more than about 550 g/l; mixing the zeolite X with the binder to prepare a zeolite X/binder blend, ion exchanging the zeolite X component of the blend with lithium ions to a level of at least about 75%; and treating the blend to form the absorbent product.

16. The process of claim 15, wherein the zeolite X is ion exchanged at least about 95% with lithium cations.

17. The process of claim 15, wherein the zeolite X comprises low silica zeolite X.

18. The process of claim 15, wherein the zeolite X has a silicon:aluminum ratio from about 1.0 to 1.25.

19. The process of claim 15, wherein the binder comprises from about 2 to about 30% of the mixture by weight.

20. The process of claim 15 from about 0.1% up to about 25% of the cations of the zeolite X comprise divalent cations.

21. The process of claim 15, wherein from about 0.1% up to about 25% of the cations of the zeolite X comprise trivalent cations.

22. The process of claim 15, wherein the binder comprises at least about 5% highly dispersed attapulgite fibers, by weight.

23. The process of claim 15, wherein the binder further comprises clay materials selected from the group consisting of conventional attapulgite, kaolin, montmorillonite and bentonite and mixtures thereof.

24. A process for separation of oxygen from a gaseous mixture containing oxygen comprising passing the gaseous mixture over the absorbent blend composition of claim 1.

* * * * *